J. C. Cox,
Horse Power,
N° 67,273.      Patented July 30, 1867.
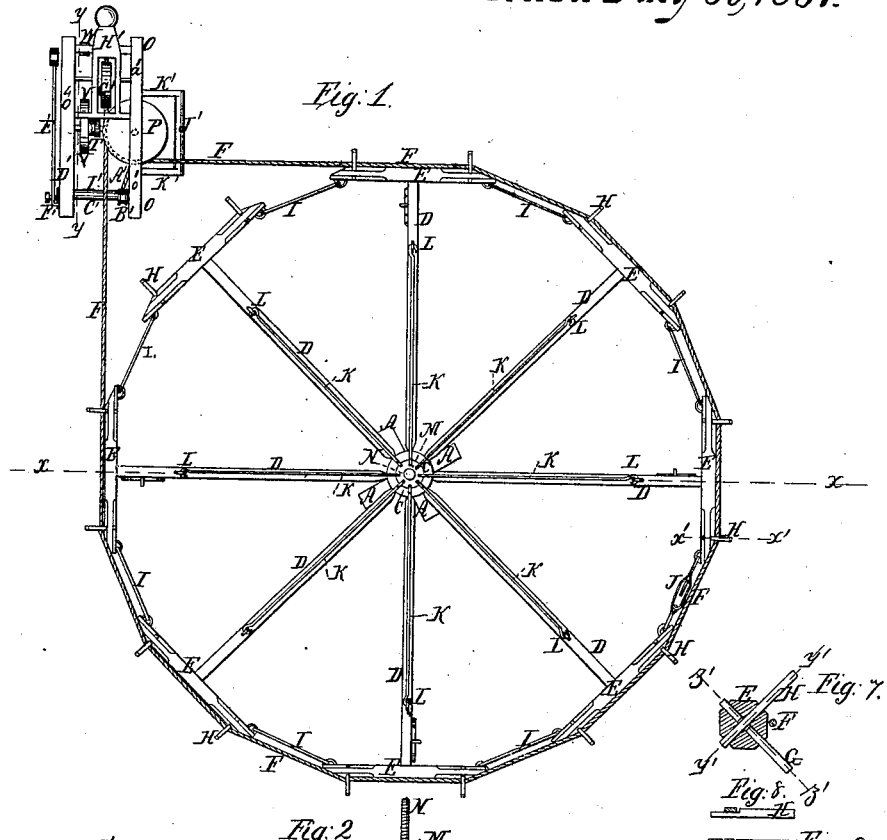
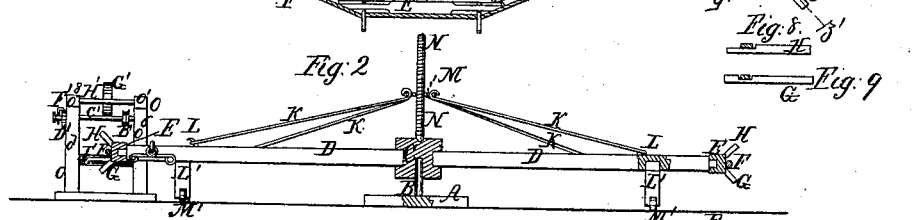
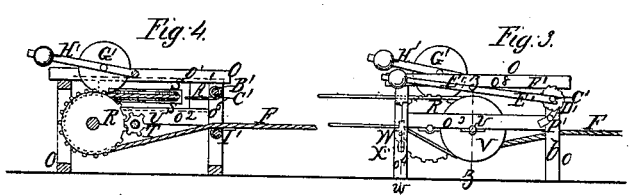
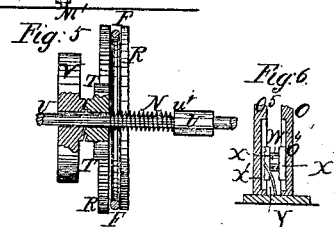
Witnesses;
F. A. Jackson
Wm Treurn
Inventor;
Jno. C. Cox
Per Munn & Co
Attorneys

United States Patent Office.

JOHN C. COX, OF GREENVILLE, NORTH CAROLINA.

Letters Patent No. 67,273, dated July 30, 1867.

---

IMPROVEMENT IN HORSE-POWER.

---

The Schedule referred to in these Letters Patent and making part of the same.

---

TO ALL WHOM IT MAY CONCERN:

Be it known that I, JOHN C. COX, of Greenville, in the county of Pitt, and State of North Carolina, have invented a new and useful Improvement in Horse-Power; and I do hereby declare that the following is a full, clear, and exact description thereof, which will enable others skilled in the art to make and use the same, reference being had to the accompanying drawings, forming part of this specification, in which—

Figure 1 is a top or plan view of my improved horse-power.

Figure 2, a vertical cross-section of the same, taken through the line $x\, x$, fig. 1.

Figure 3 is a side view of the part of the apparatus by means of which motion is communicated from the reel to the thresher or other machine to be driven.

Figure 4 is a vertical sectional view, taken through the line $y\, y$, fig. 1.

Figure 5 is a detail sectional view, taken through the line $z\, z$, fig. 3.

Figure 6 is a detail sectional view, taken through the line $w\, w$, fig. 3.

Figure 7 is a detail sectional view, taken through the line $x'\, x'$, fig. 1.

Figure 8 is a detail sectional view, taken through the line $y'\, y'$, fig. 7.

Figure 9 is a detail sectional view, taken through the line $z'\, z'$, fig. 7.

Similar letters of reference indicate like parts.

My invention has for its object to furnish an improved horse-power for imparting motion to threshers and other machines; and it consists, first, in the reel, formed by the combination of the hub-arms, cross-pieces, horns, connecting-rods, swivel-screws, supporting arms, and pulleys, screw, nut, and tightening-rods with each other; second, in the combination of the pulleys and gear-wheels, by which motion is transmitted from the reel to the machine to be driven with each other, with the frame in which they work, and with the rope; third, in the combination of the weighted lever, ratchet-wheel, shaft, pulley, cord, sliding-frame, and pulley with each other, with the frame, and with the sliding-frame, for the purpose of holding the rope always at the same tension; fourth, in the combination of a weighted frame and pulley with the frame, with the pulley, and with the rope, to prevent the said rope from slipping upon the said pulley.

A is the block or support to which the pivot B is attached. C is the hub of the reel, in the lower end of which is formed a socket, into which the pivot B enters, and supports the reel. D are arms, the inner ends of which enter mortises formed in the sides of the hub C, as shown in fig. 2. Upon the outer ends of the arms D are formed tenons, which enter mortises in the cross-pieces E. The ends of the cross-pieces E are bevelled off, so as to bring the rim of the reel around which the rope F passes nearer to the arc of a circle, as shown in fig. 1. G and H are horns, set near the ends of the cross-pieces E in an angling position, as shown in figs. 1, 2, and 7. These horns G and H are placed in mortises which pass through the cross-pieces E, intersecting each other at the centre of said cross-pieces. Upon the side of the horns G which enter from below are formed square notches, as shown in figs. 7 and 9. The lower ends of the horns H are half cut away, as shown in fig. 8; and the said horns are secured in place by being keyed into each other, as shown in fig. 7. I are connecting-rods, upon the ends of which are formed hooks, which hook into eyes attached to the ends of the cross-pieces E, as shown in fig. 1, by which the said cross-pieces are connected together. One or more of these rods may be made with a screw and swivel, as shown at J, fig. 1, so that the rim of the wheel may be drawn taut after the said rods I have been applied to the cross-pieces E. K are rods, upon the outer ends of which are formed eyes, by means of which the said rods are hooked upon the hooks L attached to the upper sides of the arms D, as shown in figs. 1 and 2. Upon the upper ends of the rods K are formed hooks, which hook into holes formed around the edge of the nut M. The nut M works upon the screw N, the lower end of which rests in a socket formed in the upper end of the hub C, as shown in fig. 2. By turning the screw N in one direction the nut M is raised, which tightens the rods K, and lifts the rim of the reel away from the ground. By turning the said screw in the other direction the rim of the wheel is lowered till it rests upon the ground, or until the rods K have been so slackened that the reel may be taken apart. To prevent the reel from rocking too much upon the pivot B there is attached to the under side of every other one of the arms D of the reel a downwardly-projecting arm, L', in the lower end of which is pivoted a friction-wheel or roller, M', which may come in contact with the ground, and support the depressed part of the reel. O is the frame which supports the pulley and gear-wheels, by means of which the motion is transmitted from the reel to the machine to be driven. The rope F upon leaving the reel passes around the horizontal pulley P, which is designed to change the direction of the rope F and keep it at a proper tension. From the pulley P the rope passes around the vertical pulley R, and thence back to the reel, as shown. The pulley P is pivoted to the sliding frame S, which slides in grooves in the bars $o^1$ and $o^2$ of the frame o, as shown in dotted lines in fig. 4. The pulley R is attached to a shaft, which revolves in bearings attached to the bars $o^2$ and $o^3$ of the frame O, as shown in figs. 4 and 5. Upon one edge or flange of the groove of the pulley R are formed teeth, which mesh into the teeth of the small cog-wheel T, which revolves loosely upon the shaft U, which shaft has its bearings in the bars $o^2$ and $o^3$ of the frame O. The driving-pulley V is secured upon the same shaft U with the cog-wheel T. Upon the hub of the wheel T is formed a clutch, which, when the said wheel T is in motion, takes hold of a clutch formed upon the hub of the pulley V, as shown in fig. 5, and carries the said pulley forward with it. But when the wheel T is stopped by the stoppage of the reel, the pulley V continues to revolve until it has exhausted its momentum and that of the balance-wheel. The cog-wheel T is held up against the pulley V by the action of the coiled wire spring N', one end of which rests against the side of the wheel T, and the other against a shoulder, $u'$, formed upon the shaft U, as shown in fig. 5. W is a friction-pulley, pivoted in a frame, X, which slides vertically in grooves formed in the upright bars $o^4$ and $o^5$ of the frame O, as shown in fig. 6, and in dotted lines in fig. 3. The frame X and pulley W are held in the required position to give the proper tautness to the driving-belt by the pawl $y$ working in the rack $x'$ formed upon the side of the frame X, as shown in fig. 6. A' is a rope or cord, one end of which is attached to the end of the frame S, and its other end to the pulley B', the shaft C' of which revolves in bearings in the uprights $o^6$ and $o^7$ of the frame O. One end of the shaft C' projects beyond the side of the frame O, and to it is attached a ratchet-wheel, D'. E' is a lever, the lower end of which is notched to fit and ride upon the end of the shaft C', which projects a little beyond the ratchet-wheel D'. This lever is also furnished with a hook, F', which takes hold of the teeth of the ratchet-wheel D', as shown in figs. 1 and 3. The outer end of the lever E' is weighted. By this arrangement a constant draught is exerted upon the frame S, keeping the rope F taut. The ratchet-wheel D' is held in place, while the lever E' is being shifted, by the pawl P', which is pivoted to the upright $o^7$ of the frame O, and works in the teeth of the ratchet-wheel D', as shown in fig. 3. By varying the position or amount of the weight upon the lever E' the tautness of the rope F may be regulated at pleasure. G' is a pulley, pivoted in a frame, H', which frame is pivoted to the side bars $o^1$ and $o^8$ of the frame O. The free end of the frame H' is weighted, and the said frame is so placed that the pulley G may come in contact with the rope F as it passes over the pulley R to prevent its slipping thereon. I is a friction-roller, pivoted to the uprights $o^6$ and $o^7$ of the frame O to serve as a guide to the rope F as it passes from the pulley R to the reel. J' is a friction-roller, pivoted to the arms K', which project from the side of the sliding frame S to serve as a guide to the rope F as it passes from the reel to the pulley P.

What I claim as new, and desire to secure by Letters Patent, is—

1. The cross-pieces E, bevelled at their ends, and provided at both ends with horns G and H, interlocking each within the cross-pieces, in the manner described as and for the purpose specified.

2. The combination of the pulleys P and R, gear-wheel T, and pulley V with each other, and with the frame O and rope F, substantially as described and for the purposes set forth.

3. The combination of the weighted lever E', ratchet-wheel D', shaft C', pulley B', and cord A' with each other, with the frame O, and with the sliding frame S, substantially as described and for the purpose set forth.

4. The combination of the pulley G' and weighted frame H' with the frame O, the pulley R, and rope F, substantially as described and for the purpose set forth.

JOHN C. COX.

Witnesses:
    D. F. WHICHARD,
    G. A. DANEY.